United States Patent [19]

Kennedy, Jr.

[11] 4,200,535
[45] Apr. 29, 1980

[54] APPARATUS FOR TRANSPORTING MATERIAL SEPARATED FROM A FLOWING FLUID

[76] Inventor: Alvin B. Kennedy, Jr., P.O. Box 897, Alvin, Tex. 77511

[21] Appl. No.: 826,475

[22] Filed: Aug. 22, 1977

[51] Int. Cl.² ............................................. B01D 35/14
[52] U.S. Cl. ............................... 210/241; 210/512 R; 280/5 C
[58] Field of Search ................. 210/512 R, 241, 66, 210/84, 104; 55/356, 358, 428, 429, 433, 459 R, 17, 385 B; 15/340; 280/5 C, 7; 220/3, 86; 141/68, 95, 113, 118, 164, 171, 271, 272, 275, 372, 377; 208/150, 152

[56] References Cited

U.S. PATENT DOCUMENTS

| | | | |
|---|---|---|---|
| 684,036 | 10/1901 | Bates | 141/272 X |
| 1,331,239 | 2/1920 | Cartwright | 210/241 |
| 1,331,900 | 2/1920 | Cartwright | 210/241 |
| 1,388,511 | 8/1921 | Cartwright | 210/241 |
| 2,712,797 | 7/1955 | Woehrle | 280/5 C |
| 2,984,358 | 5/1961 | Johnston | 208/152 |
| 3,563,475 | 2/1971 | Emery | 280/5 R |
| 3,588,137 | 6/1971 | Field | 280/5 D |
| 3,625,137 | 12/1971 | Johnson | 280/5 C |
| 3,630,242 | 12/1971 | Schleser | 141/164 |
| 3,824,771 | 7/1974 | Williams | 55/429 |
| 3,849,295 | 11/1974 | Addison | 208/150 |
| 3,856,662 | 12/1974 | Greenwood | 208/150 |
| 3,899,421 | 8/1975 | Keilin et al. | 210/104 |
| 3,955,236 | 5/1976 | Mekelbury | 55/358 |
| 4,051,069 | 9/1977 | Bunn et al. | 208/113 |

*Primary Examiner*—Theodore A. Granger
*Attorney, Agent, or Firm*—Guy E. Matthews

[57] ABSTRACT

Apparatus for transporting material separated from a flowing fluid from one location to another is disclosed. The apparatus mounts a cyclone separator on one end of an elongated container with the separator including a body having an inlet passage, a fluid outlet passage and a separated material outlet passage. The container is pivoted about an axis disposed reversely to the elongated axis of the container up to a point where the cyclone separator is operational. The flowing fluid and material passes through the inlet passageway where the material is separated from the fluid and dropped into the container, the fluid continuing through the fluid outlet passageway and back into the system from which it was withdrawn. The container is then moved about the transverse axis from the separating position back to the transporting position, the container and separated material held therein being transported to the other location.

2 Claims, 4 Drawing Figures

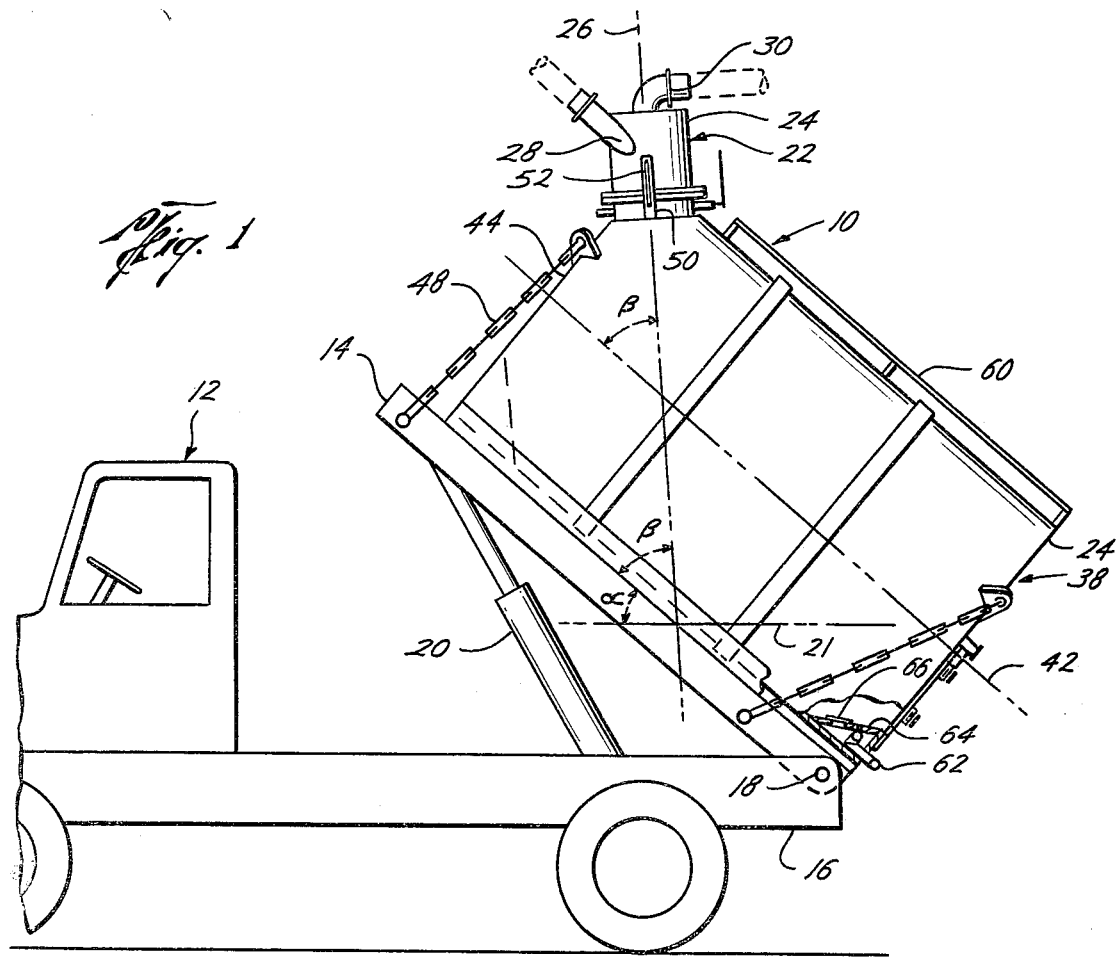
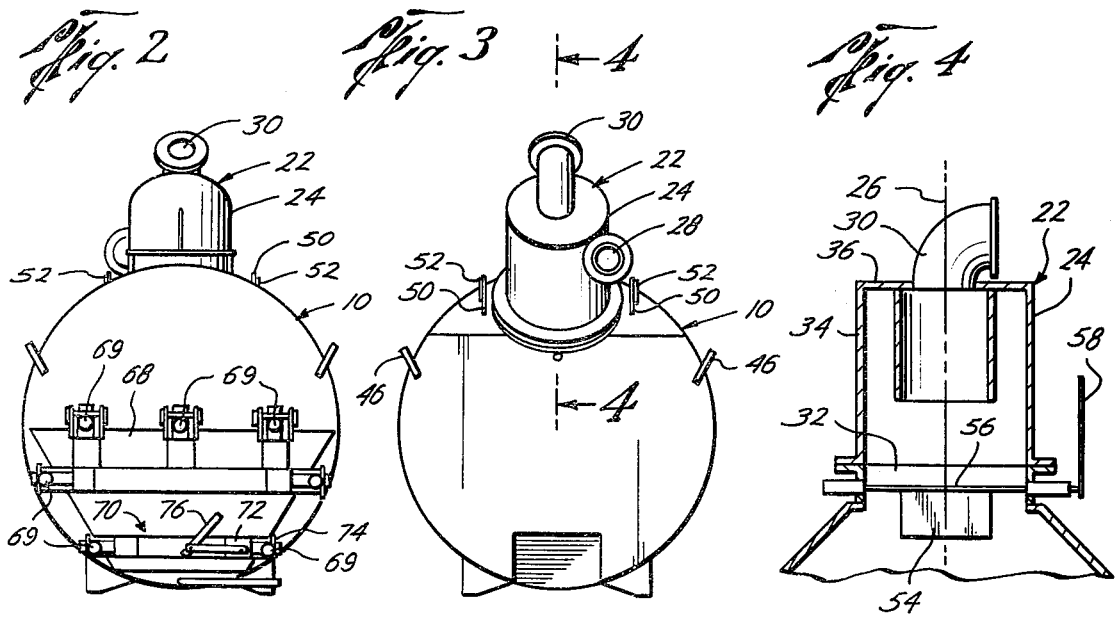

APPARATUS FOR TRANSPORTING MATERIAL SEPARATED FROM A FLOWING FLUID

BACKGROUND AND BRIEF SUMMARY OF THE INVENTION

Devices used to separate materials carried by a flowing fluid are well known. Some examples of such devices are filters, which remove the material as the fluid flows therethrough, and cyclone separators, wherein the fluid is spun around an operating axis to exert centrifugal or centripetal forces to cause separation of the material from the fluid.

Devices used to transport a material from one location to another location are also well known. Some examples of these devices are wheelbarrows, fork lift trucks, cranes and trucks, such as tractor-trailer rigs and dump trucks.

In certain situations, it is desirable to remove particulate matter carried by flowing fluid from the fluid and to deposit the material within a container for transportation to another location. An illustration of one situation which necessitates such a device and operation is when removing a catylyst from a chemical reactor with the catylyst being transported to another location for revitalization or disposal. Such catylysts are normally pyrophoric material which react violently to the oxygen in the atmosphere. Accordingly, as the catylyst is handled more and more, the liklihood of injury to an individual removing or transporting such catylyst increases.

It is, therefore, an object of the present invention to provide a device for transporting material separated from a flowing fluid from one location to another.

Further, it is an object of the present invention to provide a device for eliminating handling steps in separating a material from a flowing fluid and transporting such separated material from one location to another.

Further, it is an object of the present invention to provide a portable device for separating material from a flowing fluid and supporting the separated material during transportation from one location to another.

Further, it is an object of the present invention to provide portable device for separating pyrophoric material from an inert carrying gas and supporting the separated pyrophoric material during transportation from one location to another.

Further, it is an object of the present invention to provide a portable device for separating pyrophoric material from an inert carrying gas, supporting the separated pyrophoric material during transportation from one location to another and remotely controlling the unloading to inhibit possible injury to an individual during unloading operations.

In accordance with the invention, a portable device for separating and supporting material separated from a flowing fluid during transportation from one location to another uses a cyclone separator mounted on one end of an elongated container. The cyclone separator has a body with an operating axis, an inlet passageway, a fluid outlet passageway and a separated material outlet passageway. The elongated container has a first end where the container is pivoted about a pivotal axis, the pivotal axis lying in a horizontal plane and extending transversely to the elongate axis; and a second end with the separator mounted thereon, such pivotal movement of the container about the pivotal axis from a horizontal transporting position to a separating position moving the operating axis of the separator into a substantially vertical position for separating the material. Moreover, the second end is raised higher than the first end when pivoted to the separating position which causes the separated material to drop towards the first end to thereby aid in filling the container. Flowing fluid and material are passed through the cyclone separator for removal of the material from the flowing fluid with the fluid flowing out the fluid outlet pasageway and the separated material dropping into the elongated body. The container is moved about the transverse axis from the separating position to the transporting position and the container with the separated material supported therein are transported to the other location. The material is then unloaded from the container to permit reuse of the portable device.

BRIEF DESCRIPTION OF THE DRAWINGS

Other objects and advantages of the invention will become apparent upon reading the following detailed description and upon reference to the drawings, in which:

FIG. 1 is a side elevational view, partly in section, of an embodiment constructed according to the present invention pivoted to the separating position.

FIG. 2 is a rear elevational view of the embodiment of the invention shown in FIG. 1.

FIG. 3 is a front elevational view of the embodiment of the invention shown in FIG. 1.

FIG. 4 is an enlarged sectional view taken along lines 4—4 of the embodiment of the invention shown in FIG. 3.

While the invention will be described in connection with a preferred embodiment and procedure, it will be understood that it is not intended to limit the invention to that embodiment and procedure. On the contrary, it is intended to cover all alternatives, modifications and equivalents that may be included within the spirit and scope of the invention as defined by the appended claims.

DETAILED DESCRIPTION OF THE INVENTION

Turning now to the drawings, a portable device 10 used in separating material from a flowing fluid and supporting the separated material when moved to another location is shown mounted to a dump truck 12. Dump truck 12 includes a bed 14 pivotally attached to frame 16 at pivoting axis 18 with the front end of bed 14 being raised by use of a lifting mechanism 20, such as the hydraulic ram illustrated. In the transporting position, bed 14 rests on frame 16 to form a substantially horizontal plane 21. In the separating position, bed 14 is pivoted about axis 18 through an angle $\beta$ (Alpha) which pivots portable device 10 into the separating position.

Portable device 10 uses a cyclone separator 22 to separate the material from the flowing fluid. Separator 22 includes a body 24 positioned around an operating axis 26, an inlet passageway 28 is located in an outside wall of the body to carry the material and fluid into body 24 and around operating axis 26, a fluid outlet passage 30 is located in the body to carry the fluid from body 24 and a separated material outlet passageway 32 is located in the bottom of body 24 to carry the separated material from body 24. Preferably, body 24 is a tubular member 34 having a top 36 with inlet passageway 28 extending through tubular member 34 and fluid outlet passageway 30 extending through top 36. Most preferred, a conduit is connected to body 24 for forming inlet passageway 28 and fluid outlet passageway 30, a quick disconnecting mechanism is provided on each conduit to connect with the flowing fluid line (shown in dotted outline).

An elongated container 38 is mounted with cyclone separator 22 to support the separated material when transporting from one location to another. Container 38 has a first end 40 about which the container is pivoted and a second end 44 having cyclone separator 22 mounted thereon. The pivotal axis lies in a horizontal plane and extends tranversely to elongate axis 42 of container 38 so that second end 44 is raised higher than first end 10. Preferably, device 10 is mounted on dump truck 10 for pivoting around axis 18, which means first end 40 is the rear of elongate container 38 and second end 44 is the front end of the container and elongate axis 42 lies in horizontal plane 21 when in the transporting position.

Cyclone separator 22 is mounted on second end 44 of container 38 such that pivotal movement of container 38 about the transverse pivotal axis from a horizontal transporting position to a separating position moves operating axis 26 of separator 22 into a substantially vertical position for separating the material from the flowing fluid. Moreover, because second end 44 is raised higher than first end 40 when moved to the separating position, the separated material drops toward first end 40 while the material is being separated to thereby aid in filling container 38. Container 38 is then returned to the horizontal position for transporting the separated material to another location. Preferably, separator 22 is mounted on container 38 such that operating axis 42 forms an angle α (Beta) relative to horizontal plane 21 when container 38 is in the transporting position. The sum of angle β and α are substantially 90°. Most preferred, β is equal to substantially 40° to thereby pivot truck bed 14 through the 40°, which requires α to equal substantially 50°.

Although container 38 may be attached to dump truck bed 14 by any method, it is preferred that an eyelet 46 is attached on either side of container 38 at first end 40 and second end 44 so that chains 48 may be used to secure container 38 to bed 14.

When so desired, a position indicating means is included to show where operating axis 26 is substantially vertical. Preferably, this position indicating means includes a lever arm 50 positioned on each side of separator 22 and extending from container 38 and at an angle substantially parallel to operating axis 26, angle α. An indicating arm 52 hangs from lever arm 50 by a pivotal connection which permits free pivoting movement. Thus, as container 38 is rotated about the pivotal axis, lever arm 50 is also rotated. When indicating arm 52 lies substantially parallel to lever arm 50, separator 22 and container 38 are in the proper operating position. Most preferred, the angle between indicating arm 50 and elongate axis is 50°, so that truck bed 14 is only rotated through 40°.

Also, when desired a fullness indicating means is mounted with container 38 for indicating when the container is ready for transportation, i.e., when container 38 is full. Preferably, this indicating means is positioned between container 38 and cyclone separator 22 and takes the form of a feeler flap 54 attached to a rod 56 rotatably disposed between container 38 and separator 22. A handle 58 is mounted with rod 56 for controlling the movement of feeler flap 54, which indicates when container 38 is full by feeling contact with material when flap 54 moves against the separated material when container 38 is full. A ladder 60 may be mounted along the top of container 38 to permit movement of an individual to and from handle 58 for use of the fullness indicator, when container 38 is in the separating position.

When portable device 10 is used to separate pyrophoric material from an inert carrying gas, it is especially desirable to purge container 38 and separator 22 prior to using device 10. Thus, a purge pipe 62 which leads from a gas source (not shown) into container 38 is provided. A purge plate 64 having a plurality of holes extending therethrough is mounted within container 38 to receive purge gas from purge pipe 62 and diffuse the gas over the area of the purge plate. Moreover, because particulate matter may pass through the holes in purge plate 64, a cleanout plate 66 is provided to permit removal of such matter from between container 38 and purge plate 64.

A door 68 covering an opening within first end 40 is mounted with container 38 to permit removal of the separated material. When pyrophoric material is being separated, it is preferred that door 68 seal the opening to prevent passage of the atmosphere into container 38 and that a remotely controlled door opening means 70 be mounted between door 68 and container 38 to permit opening the door from a distance which inhibits possible injury to an individual when opening door 68 to unload the separated pyrophoric material. Handwheels 69 having a threaded connection with nuts mounted on container 38 are used to draw door 68 into engagement against container 38 and seal the door. Remote door opening means 70 uses a plate 72 slidably mounted on door 68 which slides into a slot 74 provided on container 38. A control arm 76 is pivotally mounted on door 68, has a first end pivotally mounted with plate 72 and a second end for attaching a line thereto. The door is opened by turning handwheels 69 to loosen the seal around the door, the operator pulls the line attached to the second end of arm 76 which slides plate 72 from slot 74 permitting access into container 38. Thus, door 68 can be opened by an individual remote from the door, which inhibits possible injury to the individual. Moreover, when container 38 is mounted to dump truck 12, bed 14 may may be raised to the dumping position before opening the door.

Thus, is is apparent that there has been provided, in accordance with the invention, a method of and apparatus for separating and transporting material separated from a flowing fluid from one location to another that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A portable device used in separating material from a flowing fluid and supporting the separated material during transportation to another location, comprising:
   (a) a cyclone separator for separating material from the flowing fluid, said cyclone separator having
   (i) a body positioned around an operating axis, (ii) an inlet passageway located in an outside wall of the body to carry material and fluid into the body and around the operating axis, (iii) a fluid outlet passageway located in the body to carry the fluid from the body, and (iv) a separated material outlet passageway located in the bottom of the body, to carry the separated material from the body; and (b) an elongated container mounted with said cyclone separator for receiving the material being separated and supporting the separated material during transportation from one location to another, said container having (i) a first end, including a door mounted therewith where the container is pivoted around a pivotal axis, the pivotal axis lying in a horizontal plane and extending transversely to the elongate axis, (ii) a second end having said cyclone separator mounted thereon, said separator being mounted on said container so that pivotal movement of the container about the transverse pivotal axis from a horizontal transporting position to a separating position moves the operating axis of said separator into a substantially vertical position for separating the material, the second end being raised higher than the first end when moved to the separating position which causes the separated material to drop toward the first end while the material is being separated as an aid in filling said container, the container being returned about the transverse axis to the horizontal position for transporting the separated material to another location; said container being mounted with the operating axis forming an angle relative to the horizontal plane when said container is in transporting position, the sum of this angle and the angle formed between the transporting position and separating position being substantially 90°;

(c) fullness indicating means mounted with said container for indicating when said container is ready for transporting, said means comrprising:

(i) a feeler flap attached to a rod rotatably disposed between said container and said cyclone separator, and (ii) a handle mounted with the rod for controlling the movement of said feeler flap to indicate when said container is full by contact between the flap and separated material;

(d) position indicating means mounted with said container for indicating when said container is in the separating position for operating said cyclone separator, said means comprising:

(i) a lever arm extending from said container at an angle substantially parallel to the operational axis of said cyclone separator, and (ii) an indicating arm mounted on said lever arm in free pivotal movement for indicating the operating position of said cyclone separator when lying substantially parallel to said lever arm;

(e) a remotely controlled door opening means mounted between said first end door and said container to open said door from a distance to thereby inhibit possible injury to air individual when opening said door for unloading the separated material therefrom, said means comprising:

(i) a plate slidably mounted on said door for movement into a slot provided on said container and (ii) a control arm pivotally mounted with said door, said control arm having a first end pivotally mounted with said plate and a second end for attaching a line thereto which permits the opening of said door from a distance.

2. The device of claim 1 wherein the angle formed between the operating axis of said cyclone separating means and the elongate axis of said container is substantially 50° and the angle formed between the transporting position and separating position is 40°.

* * * * *